United States Patent
Tamura

(10) Patent No.: US 12,292,651 B2
(45) Date of Patent: May 6, 2025

(54) PLANAR LIGHT SOURCE AND LIQUID CRYSTAL DISPLAY DEVICE

(71) Applicant: NICHIA CORPORATION, Anan (JP)

(72) Inventor: Takeshi Tamura, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/619,298

(22) Filed: Mar. 28, 2024

(65) Prior Publication Data

US 2024/0329461 A1 Oct. 3, 2024

(30) Foreign Application Priority Data

Mar. 31, 2023 (JP) ................................. 2023-058281

(51) Int. Cl.
*G02F 1/13357* (2006.01)
*G02F 1/1335* (2006.01)

(52) U.S. Cl.
CPC .. *G02F 1/133611* (2013.01); *G02F 1/133606* (2013.01); *G02F 1/133607* (2021.01)

(58) Field of Classification Search
CPC ......... G02F 1/133603; G02F 1/133605; G02F 1/133606; G02F 1/133607; G02F 1/133611
See application file for complete search history.

(56) References Cited

U.S. PATENT DOCUMENTS

| | | | |
|---|---|---|---|
| 7,501,656 B2* | 3/2009 | Han | G08G 5/21 257/E33.001 |
| 2011/0037740 A1 | 2/2011 | Yamaguchi | |
| 2014/0369049 A1* | 12/2014 | Tsuchiya | F21V 3/049 362/307 |
| 2017/0261161 A1* | 9/2017 | Moon | F21K 9/61 |
| 2020/0285115 A1* | 9/2020 | Ito | G02B 6/0043 |

FOREIGN PATENT DOCUMENTS

| | | |
|---|---|---|
| JP | 2007-109692 A | 4/2007 |
| WO | WO-2010/070885 A1 | 6/2010 |
| WO | WO-2012/023459 A1 | 2/2012 |
| WO | WO-2020/101038 A1 | 5/2020 |

\* cited by examiner

*Primary Examiner* — Tracie Y Green
*Assistant Examiner* — Michael Chiang
(74) *Attorney, Agent, or Firm* — Foley & Lardner LLP

(57) ABSTRACT

A planar light source includes: a plurality of light sources disposed two-dimensionally, each including: a light-emitting element, a light-transmissive member covering the light-emitting element, and a light adjustment member disposed on an upper surface of the light-transmissive member and located above the light-emitting element. The plurality of light sources include, in a top view, a plurality of central light sources disposed in a central region, and a plurality of peripheral light sources disposed in a peripheral region located outward of the central region. The plurality of peripheral light sources include a first light source in which a light transmittance of the light adjustment member is higher than a light transmittance of the light adjustment members of the central light sources.

16 Claims, 16 Drawing Sheets

Fig. 6
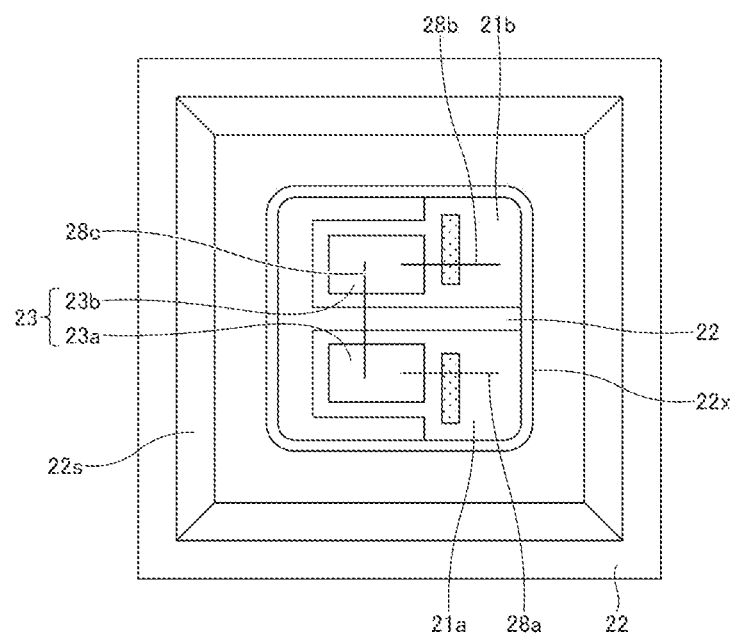
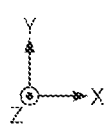

Fig. 7
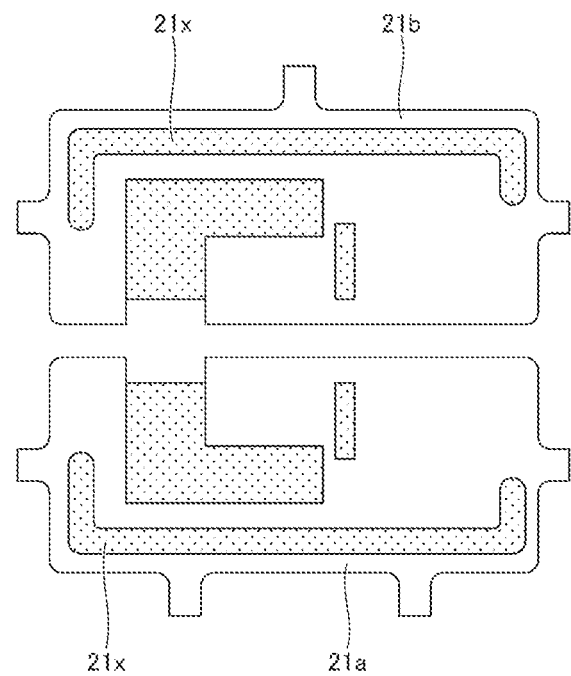
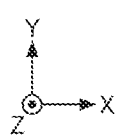

Fig. 8
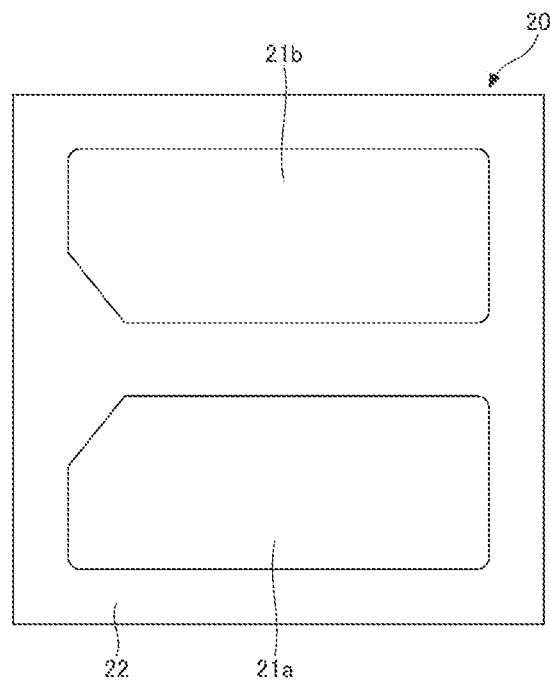
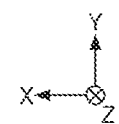

PLANAR LIGHT SOURCE AND LIQUID CRYSTAL DISPLAY DEVICE

CROSS-REFERENCE TO RELATED APPLICATION

This application claims priority to Japanese Patent Application No. 2023-058281, filed on Mar. 31, 2023, the disclosure of which is hereby incorporated by reference in its entirety.

TECHNICAL FIELD

The present disclosure relates to a planar light source and a liquid crystal display device.

BACKGROUND

Planar light sources using light-emitting elements are widely used as various light sources such as a backlight for a liquid crystal display device.

An example of such a planar light source is a planar lighting device including a plurality of light sources disposed on the same plane. In this planar lighting device, each of the plurality of light sources includes, for example, a substrate, an LED element mounted on the substrate, a resin portion encapsulating the LED element, and a reflection portion disposed on the opposite side of the resin portion from the substrate. The reflection portion has characteristics of reflecting most of the light from the LED element and transmitting the remaining light (for example, see Patent Publication No. WO 2010/070885).

SUMMARY

An object of the present disclosure is to reduce luminance unevenness in a planar light source.

A planar light source according to an embodiment of the present disclosure includes a plurality of light sources disposed two-dimensionally, each of the light sources including a light-emitting element; a light-transmissive member covering the light-emitting element; and a light adjustment member disposed on an upper surface of the light-transmissive member and located above the light-emitting element. The plurality of light sources include, in a top view, a plurality of central light sources disposed in a central region and a plurality of peripheral light sources disposed in a peripheral region located on an outer side of the central region. The plurality of peripheral light sources include a first light source in which a light transmittance of the light adjustment member is higher than a light transmittance of the light adjustment members of the central light sources.

In the planar light source according to an embodiment of the present disclosure, luminance unevenness can be reduced.

BRIEF DESCRIPTION OF DRAWINGS

FIG. 6 is a schematic top view in which a first light-transmissive member, a second light-transmissive member, and a light adjustment member are omitted from the light source illustrated in FIG. 1.

FIG. 7 is a schematic top view illustrating leads of the light source in FIG. 1.

FIG. 8 is a schematic bottom view of the light source of FIG. 1.

DETAILED DESCRIPTIONS

Figure 1:
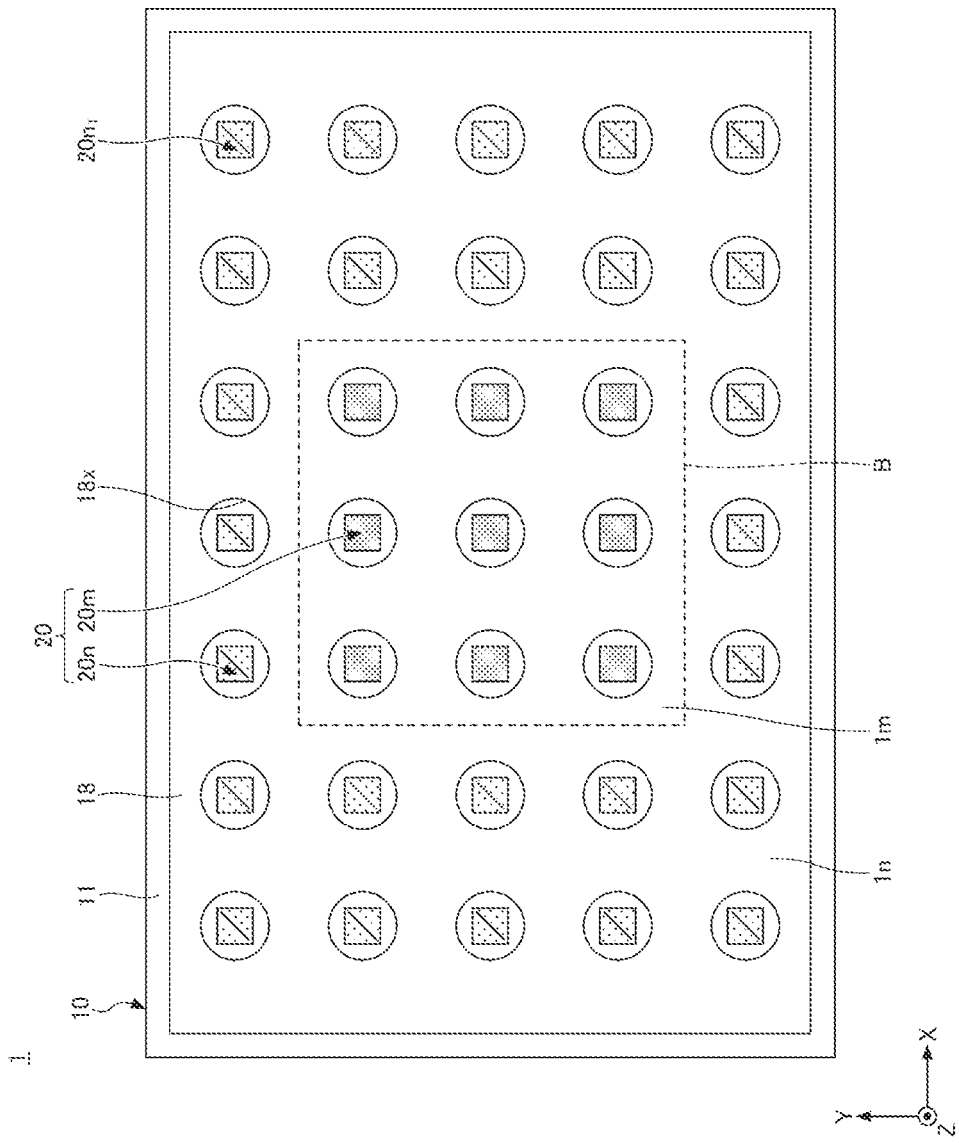
FIG. 1 is a schematic top view illustrating a planar light source according to a first embodiment.

Hereinafter, embodiments for carrying out the invention will be described with reference to the drawings. Note that, in the following description, terms indicating a specific direction or position (e.g., "upper/upward", "lower/downward", and other terms including those terms) are used as necessary. The use of those terms, however, is to facilitate understanding of the invention with reference to the drawings, and the technical scope of the present invention is not limited by the meanings of those terms. Parts having the same reference signs appearing in a plurality of drawings indicate identical or equivalent parts or members.

Further, the embodiments to be illustrated below exemplify planar light sources for embodying the technical concept of the present invention, and do not limit the present invention to the following. The dimensions, materials, shapes, relative arrangements, and the like of constituent components described below are not intended to limit the scope of the present invention to those alone, but are intended to provide an example, unless otherwise specified. The contents described in one embodiment can be applied to the other embodiment and a variation. The sizes, positional relationship, and the like of the members illustrated in the drawings can be exaggerated in order to clarify the explanation. Furthermore, to avoid excessive complication of the drawings, a schematic view in which some elements are not illustrated may be used, or an end view illustrating only a cutting surface may be used as a cross-sectional view.

First Embodiment

Planar Light Source 1

Figure 2:
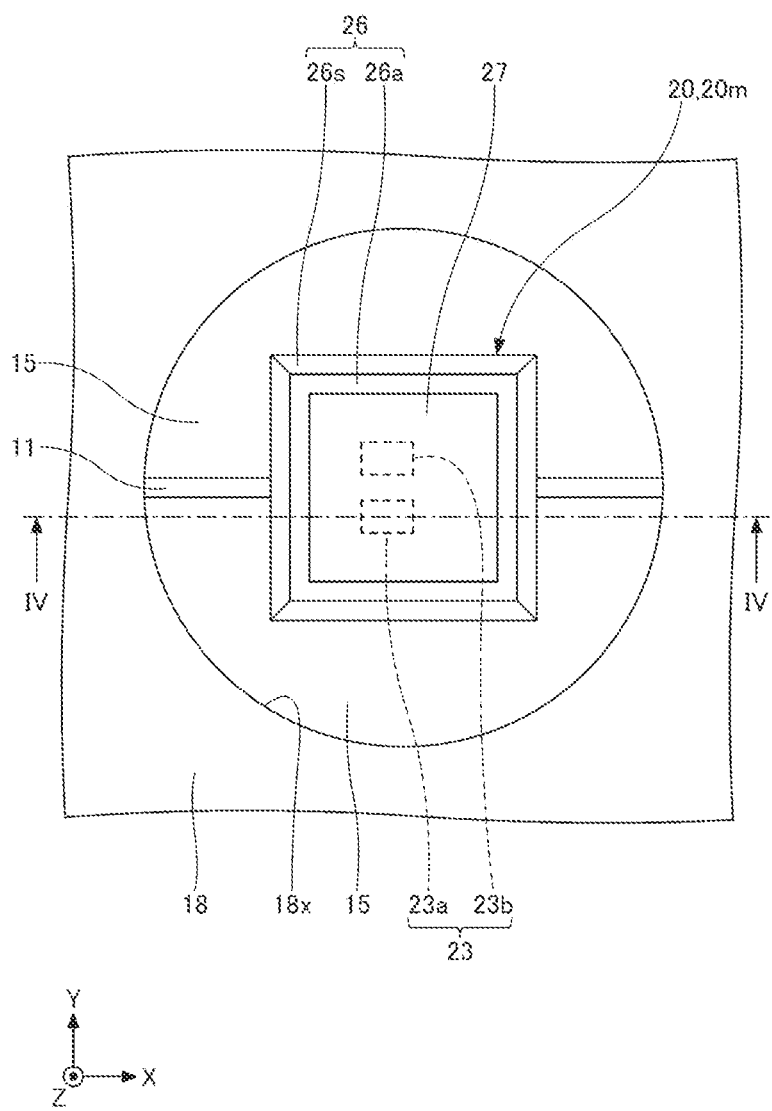
FIG. 2 is an enlarged schematic partial top view of a central light source and its vicinity in FIG. 1.
Figure 3:
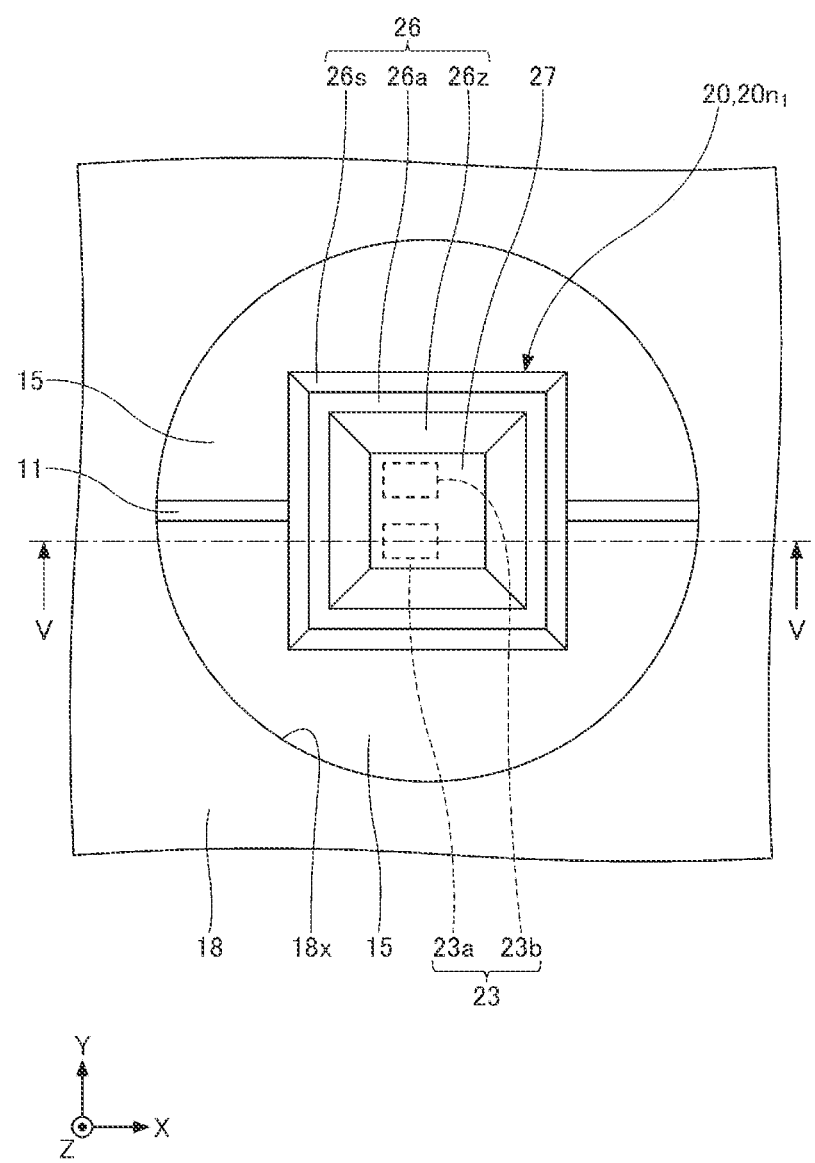
FIG. 3 is an enlarged schematic partial top view of a first light source and its vicinity in FIG. 1.
Figure 4:
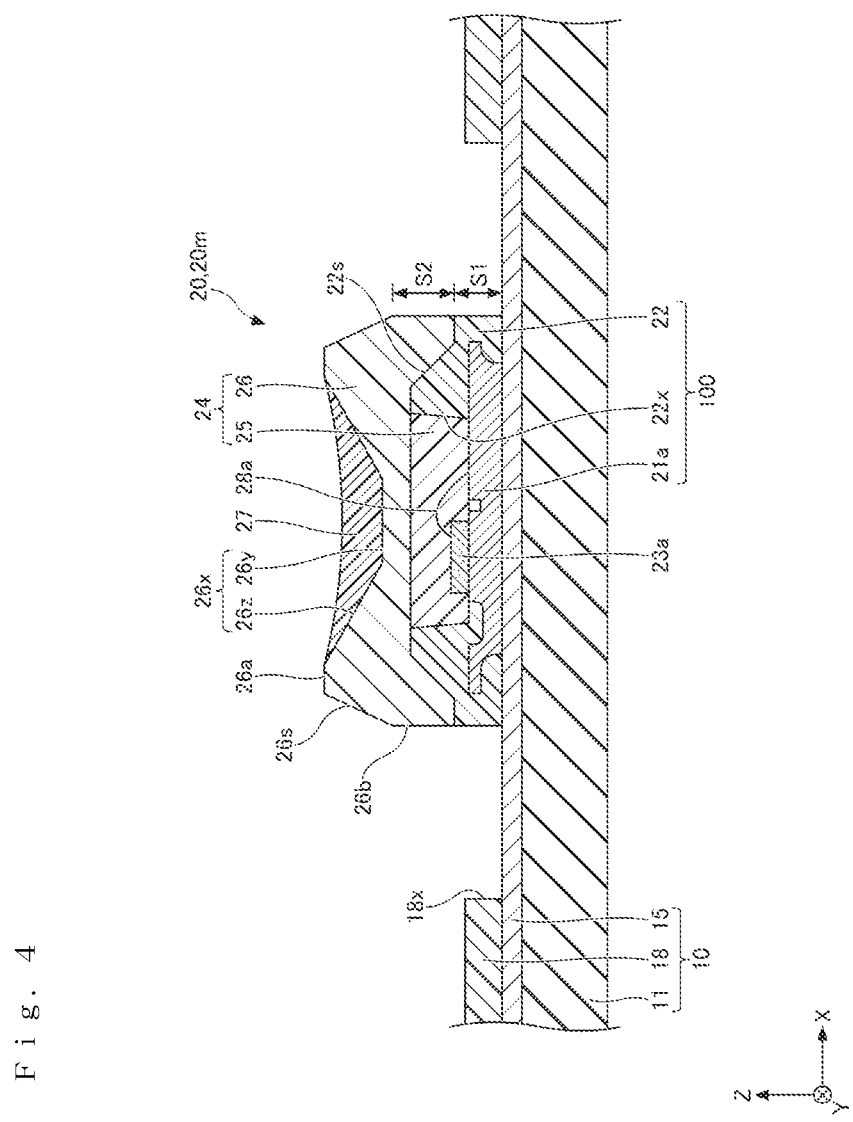
FIG. 4 is a schematic cross-sectional view taken along line IV-IV in FIG. 2.
Figure 5:
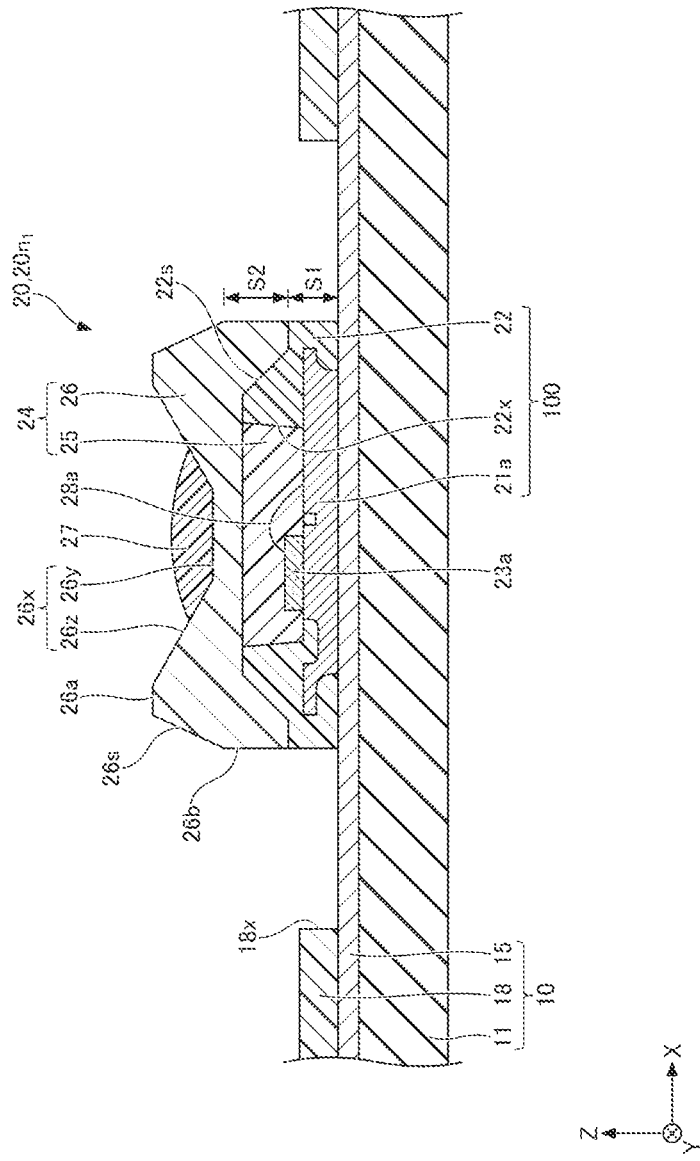
FIG. 5 is a schematic cross-sectional view taken along line V-V in FIG. 3.

FIG. 1 is a schematic top view illustrating a planar light source according to a first embodiment. FIG. 2 is an enlarged schematic partial top view of a central light source and its vicinity in FIG. 1. FIG. 3 is an enlarged schematic partial top view of a first light source and its vicinity in FIG. 1. FIG. 4 is a schematic cross-sectional view taken along line IV-IV in FIG. 2. FIG. 5 is a schematic cross-sectional view taken along line V-V in FIG. 3. FIG. 6 is a schematic top view in which a first light-transmissive member, a second light-transmissive member, and a light adjustment member are omitted from the light source illustrated in FIG. 1. FIG. 7 is a schematic top view illustrating leads of the light source in FIG. 1. FIG. 8 is a schematic bottom view of the light source of FIG. 1. The X direction and/or the Y direction illustrated in each figure may be referred to as a lateral direction, and the Z direction may be referred to as a vertical direction.

Referring to FIG. 1, a planar light source 1 includes a substrate 10 and a plurality of light sources 20 disposed two-dimensionally. In the planar light source 1, the light sources 20 are disposed in a matrix on the substrate 10, for example. As illustrated in FIGS. 2 to 8, each of the plurality of light sources 20 includes a light-emitting element 23, a light-transmissive member 24 covering the light-emitting element 23, and a light adjustment member 27 disposed on an upper surface of the light-transmissive member 24 and located above the light-emitting element 23.

As illustrated in FIG. 1, in a top view, the planar light source 1 includes, as regions where the plurality of light sources 20 are disposed, a central region 1m located on the central side with respect to a boundary B and a peripheral region 1n located on the outer side with respect to the boundary B. That is, in a top view, the peripheral region 1n is located outside from the central region 1m. The position of the boundary B is not limited to the example illustrated in FIG. 1. The boundary B only needs to be defined such that at least all of the light sources 20 located at the outermost periphery of the planar light source 1 are included in the peripheral region 1n.

In the planar light source 1, among the plurality of light sources 20, light source(s) disposed in the central region 1m is referred to as central light source(s) 20m, and light source(s) disposed in the peripheral region 1n is referred to as peripheral light source(s) 20n. The plurality of light sources 20 include a plurality of the central light sources 20m disposed in the central region 1m and a plurality of the peripheral light sources 20n disposed in the peripheral region 1n in a top view. The plurality of peripheral light sources 20n include a first light source $20n_1$ in which a light transmittance of the light adjustment member 27 is higher than a light transmittance of the light adjustment members 27 of the central light sources 20m.

In the planar light source in which the light sources are two-dimensionally arranged, the luminance in a region above the light source(s) located at the outermost periphery tends to be low. This is because a certain luminance can be ensured in the region where the portions of light traveling obliquely upward from the adjacent light sources intersect with each other, whereas the light sources located at the outermost periphery have no adjacent light source on the outer peripheral side, so that the amount of the light portions intersecting with each other on the upper side is small.

In the planar light source 1, as described above, because the light transmittance of the light adjustment member 27 of the first light source $20n_1$ located in the peripheral region 1n is higher than the light transmittance of the light adjustment members 27 of the central light sources 20m, the luminance on the optical axis of the first light source $20n_1$ is higher than the luminance on the optical axis of the central light source 20m. As a result, luminance unevenness between the central region 1m and the peripheral region 1n of the planar light source 1 can be reduced.

When the light source 20 includes the light adjustment member 27, light emitted from the light source 20 in the optical axis direction of the light source 20 (the light distribution angle is 0 degrees) is partially blocked or reflected. Therefore, it has a light emission intensity distribution in which the emission intensity is the highest at a light distribution angle larger than 0 degrees. When the light transmittance of the light adjustment member 27 is increased, the emission intensity in the optical axis direction is increased. When the light transmittance of the light adjustment member 27 is decreased, the emission intensity in the optical axis direction is decreased. In this manner, the emission intensity distribution of the light source 20 can be adjusted. By setting the light transmittance of the light adjustment member 27 of the first light source $20n_1$ to higher than the light transmittance of the light adjustment members 27 of the central light sources 20m, the emission intensity in the peripheral region 1n can be increased, and thus the luminance unevenness of the planar light source 1 can be reduced. When the maximum emission intensity of the first light source $20n_1$ and the maximum emission intensity of the central light sources 20m are equal to each other, the emission intensity of the first light source $20n_1$ in the optical axis direction is more than 1 time and 1.6 times or less, preferably more than 1.05 times and 1.2 times or less the emission intensity of the central light source 20m in the optical axis direction. When the maximum emission intensity of the first light source $20n_1$ and the maximum emission intensity of the central light sources 20m are different from each other, the relative emission intensity of the emission intensity of the first light source $20n_1$ in the optical axis direction with respect to the maximum emission intensity is more than 1 time and 1.6 times or less, preferably more than 1.05 times and 1.2 times or less the relative emission intensity of the emission intensity of the central light source 20m in the optical axis direction with respect to the maximum emission intensity. Within such a range, it is possible to reduce luminance unevenness between the central region 1m and the peripheral region 1n of the planar light source 1.

In FIG. 1, the central light sources 20m are indicated by high-density dot patterns, and the peripheral light sources 20n are indicated by low-density dot patterns. The first light source $20n_1$ is indicated by a low-density dot pattern and an oblique line. The peripheral light sources 20n only need to include at least one first light source $20n_1$. In the example illustrated in FIG. 1, all the peripheral light sources 20n are the first light sources $20n_1$.

In the example illustrated in FIGS. 2 to 8, each of the light sources 20 includes leads 21a and 21b, a resin member 22, light-emitting elements 23a and 23b, wires 28a, 28b, and 28c, the light-transmissive member 24, and the light adjustment member 27. The leads 21a and 21b and the resin member 22 are support bodies that support the light-emitting elements 23a and 23b.

Portions of upper surfaces of the leads 21a and 21b are exposed inward of the inner lateral surface of the resin member 22. The leads 21a and 21b are exposed from the resin member 22 on the lower surface of the light source 20. The light-emitting element 23a is disposed on a portion of the lead 21a exposed inward of the inner lateral surface of the resin member 22. The light-emitting element 23b is disposed on a portion of the lead 21b exposed inward of the inner lateral surface of the resin member 22. The wire 28a connects the upper surface of the lead 21a and the upper surface of the light-emitting element 23a. The wire 28b connects the upper surface of the lead 21b and the upper surface of the light-emitting element 23b. The wire 28c connects the upper surface of the light-emitting element 23a and the upper surface of the light-emitting element 23b. The light-emitting elements 23a and 23b are connected in series via the wires 28a, 28b, and 28c.

The light-transmissive member 24 may be composed of a first light-transmissive member 25 and a second light-transmissive member 26. For example, the first light-transmissive member 25 is located in a recessed portion 22x defined by the bottom surface and the inner lateral surface of the resin member 22, and covers the light-emitting elements 23a and 23b. The upper surface of the first light-transmissive member 25 is located on the same plane as the upper surface of the resin member 22, for example. The second light-transmissive member 26 covers, for example, the upper surface of the resin member 22 including an inclined surface 22s and the upper surface of the first light-transmissive member 25.

An upper surface 26a of the second light-transmissive member 26 may be a flat surface or need not be a flat surface. In the example illustrated in FIGS. 4 and 5, the upper surface 26a of the second light-transmissive member 26 has a recessed portion 26x that is located above the light-emitting elements 23a and 23b and opens on the upper surface 26a side. The light adjustment member 27 is disposed in the recessed portion 26x. In the case in which the light adjustment member 27 contains a resin, the light adjustment member 27 can be disposed in the recessed portion 26x by using, for example, a dropping method. The second light-transmissive member 26 has surfaces defining the recessed portion 26x which are a bottom surface 26y and an inner lateral surface 26z inclined with respect to the bottom surface 26y.

The light adjustment member 27 is disposed on the upper surface of the light-transmissive member 24 and located above the light-emitting element 23. Thus, in the light source 20, assuming that the optical axis of the light source 20 is 0°, it is possible to obtain a batwing type emission intensity distribution in which the emission intensity is higher, than at 0°, at angles where the absolute value of the light distribution angle is larger than 0°.

By providing the recessed portion 26x in the upper surface 26a of the second light-transmissive member 26 and disposing the light adjustment member 27 in the recessed portion 26x, the light adjustment member 27 can be disposed without increasing the thickness of the light source 20. In addition, the thickness of the light adjustment member 27 at the center of the recessed portion 26x can be increased, and the thickness of the light adjustment member 27 can be decreased toward the outer periphery of the recessed portion 26x. Thus, the light transmittance at the center of the light adjustment member 27 can be reduced, and the light transmittance can be increased toward the outer side of the light adjustment member 27. Therefore, the batwing type emission intensity distribution is easily obtained.

The shape of the recessed portion opening in the upper surface 26a portion of the second light-transmissive member 26 is not limited to the shapes illustrated in FIGS. 4 and 5. For example, a shape without a bottom surface defining a recessed portion, that is, a circular arc shape or a V-shape that protrudes toward the first light-transmissive member 25 side in cross-sectional view may be used.

As illustrated in FIG. 4, in the central light source 20m, the light adjustment member 27 covers the entire bottom surface 26y and the entire inner lateral surface 26z, for example. The upper surface of the light adjustment member 27 has a shape that is concave toward the bottom surface 26y.

On the other hand, as illustrated in FIG. 5, in the first light source $20n_1$, the light adjustment member 27 covers the bottom surface 26y and a portion of the inner lateral surface 26z at the bottom surface 26y side, and does not cover a portion of the second light-transmissive member 26 at the upper surface 26a side of the inner lateral surface 26z. Also, the upper surface of the light adjustment member 27 has a shape that is convex in a direction away from the bottom surface 26y defining the recessed portion. The light adjustment member 27 does not cover the upper surface 26a side of the second light-transmissive member 26 of the inner lateral surface 26z of the recessed portion 26x, so that light extraction in the optical axis direction from the upper surface 26a side of the second light-transmissive member 26 of the inner lateral surface 26z of the recessed portion 26x can be enhanced.

In the present embodiment, a case will be described in which the light adjustment member 27 in each of the first light sources $20n_1$ and the central light sources 20m contains a light reflective material to be described below and the concentration of the light reflective material contained in the light adjustment member 27 in each of the first light sources $20n_1$ is the same as the concentration of the light reflective material contained in the light adjustment member 27 in each of the central light sources 20m. In this case, the volume of the light adjustment member 27 in each of the first light sources $20n_1$ is preferably smaller than the volume of the light adjustment member 27 in each of the central light sources 20m. In that case, the light transmittance of the light adjustment member 27 of each of the first light sources $20n_1$ can be made higher than the light transmittance of the light adjustment member 27 of each of the central light sources 20m. As a result, because the luminances on the optical axes of the first light sources $20n_1$ are higher than the luminances on the optical axes of the central light sources 20m, it is possible to reduce the luminance unevenness between the central region 1m and the peripheral region 1n of the planar light source 1 as described above.

Substrate 10

The substrate 10 is a member on which the plurality of light sources 20 are placed. In the example of FIG. 4, the substrate 10 includes a base member 11, a conductor wiring 15, and a covering member 18. The conductor wiring 15 is a member for supplying power to the light source 20, and is disposed on the upper surface of the base member 11. The covering member 18 covers, for example, a part of a region of the conductor wiring 15 that is not electrically connected to the light source 20. The covering member 18 has an opening 18x, and the light source 20 is disposed in the opening 18x.

A material capable of isolating at least a pair of conductor wirings 15 can be used for the base member 11, and examples of the material include ceramics, resins, and composite materials. Examples of the resins include a phenol resin, an epoxy resin, a polyimide resin, a BT resin, polyphthalamide (PPA), and polyethylene terephthalate (PET). Examples of the composite materials include a mixture of any one of the above-mentioned resins and an inorganic filler such as glass fiber, silicon oxide, titanium oxide, aluminum oxide, or the like, a glass fiber reinforced resin (glass epoxy), and a metal substrate in which a metal member is coated with an insulating layer.

The thickness of the base member 11 can be appropriately selected. The base member 11 can be either a flexible substrate that can be manufactured in roll-to-roll processing or a rigid substrate. The rigid substrate may be a bendable thin rigid substrate.

A material of the conductor wiring 15 is not particularly limited as long as it is a conductive member, and a material generally used as a wiring layer of a circuit board or the like can be used. As the material of the conductor wiring 15, for example, copper can be used.

The covering member 18 has an insulating property. Examples of the material of the covering member 18 include the same materials as those exemplified as the material of the base member 11. As the covering member 18, any of the above-mentioned resins containing a white light reflective filler or a large number of air bubbles can be used. In that case, the light emitted from the light source 20 is reflected by the covering member 18, so that the light extraction efficiency of the planar light source 1 can be improved.

Light Source 20

Hereinafter, members included in the light source 20 will be described in detail.

Leads 21a, 21b

The lead 21a and the lead 21b are members that are electrically connected to either the negative electrode or the positive electrode of the pair of electrodes of the light-emitting elements 23a and 23b to supply electricity to the light-emitting elements 23a and 23b. As the material for the lead 21a and the lead 21b, for example, metals such as copper, aluminum, gold, silver, iron, nickel, alloys thereof, phosphor bronze, and iron-containing copper can be used. The lead 21a and the lead 21b can be formed into a predetermined shape by processing such as rolling, punching, extrusion, etching such as wet or dry etching, or a combination thereof. As the material for the lead 21a and the lead 21b, it is preferable to use copper having a high heat dissipation property. The lead 21a and the lead 21b may have a single-layer structure or a layered structure.

In order to improve reflectance, a metal plating of silver, aluminum, copper, gold, or the like may be applied in a single-layer or a layered structure to portions or the entire surfaces of the lead 21a and the lead 21b. When a metal layer containing silver is formed on the outermost surfaces of the lead 21a and the lead 21b, a protective layer of silicon oxide or the like is preferably provided on the surface of the metal layer containing silver. This can reduce the possibility that the metal layer containing silver will be discolored by, for example, sulfur components in the atmosphere. Examples of a method for forming the protective layer include a known method such as vacuum processing, such as sputtering or the like.

As illustrated in FIG. 7, it is preferable that grooves 21x are provided in the upper surfaces of the leads 21a and 21b. At least one of the grooves 21x is recessed downward from the upper surfaces of the leads 21a and 21b. The grooves 21x can be formed by etching, pressing, or the like. The grooves 21x may be provided around the light-emitting elements 23a and 23b in a top view, or may be disposed elsewhere. In the example of FIG. 6, a portion of the resin member 22 is located within the grooves 21x. This can improve the adhesion between the resin member 22 and the leads 21a and 21b.

When the leads 21a and 21b are exposed from the resin member 22 on the lower surface of the light source 20 as illustrated in FIG. 8, heat from the light source 20 is easily transferred to the substrate 10, on which the light source 20 is mounted, via the leads 21a and 21b. Therefore, the heat dissipation property of the light source 20 can be improved. The lower surfaces of the leads 21a and 21b exposed from the resin member 22 can be used as external terminal portions for electrical connection to the substrate 10. The light source 20 may include three or more leads.

Resin Member

The resin member 22 is a member that is located between the lead 21a and the lead 21b and holds the lead 21a and the lead 21b. In the resin member 22, parts of the lead 21a and the lead 21b are embedded. The resin member 22, the lead 21a, and the lead 21b can constitute a resin molded body 100.

The resin molded body 100 has the recessed portion 22x defined by a bottom surface and an inner lateral surface of the resin member 22, and portions of the bottom surface defining the recessed portion 22x is constituted by the upper surfaces of the lead 21a and the lead 21b. In the example illustrated in FIG. 4, the inner lateral surface of the resin member 22 is an inclined surface that is inclined outward toward upward from the upper surfaces of the lead 21a and the lead 21b. Thus, light from the light-emitting elements 23a and 23b can be reflected upward. The light-emitting elements 23a and 23b are respectively disposed on the upper surfaces of the lead 21a and the lead 21b that define the bottom surface of the recessed portion 22x. The inner lateral surface of the resin member 22 may be an inclined surface that is inclined with respect to the upper surfaces of the lead 21a and the lead 21b, or may be a vertical surface that is perpendicular to the upper surfaces of the lead 21a and the lead 21b.

In the example illustrated in FIG. 6, the top view shape of the bottom surface that defines the recessed portion 22x is rectangular. The upper end of the lateral surfaces defining the recessed portion 22x has a rectangular shape in a top view. The term "rectangular" as used herein includes not only a shape having right-angle corners but also a shape having chamfered corners. The shape having chamfered corners includes a shape in which two orthogonal sides are connected to a curved line, a shape in which two orthogonal sides are connected to a straight line, and the like.

As a material of the resin member 22, a known material such as a thermosetting resin or a thermoplastic resin can be used. Examples of the thermoplastic resin include a polyphthalamide resin, a polybutylene terephthalate (PBT), and an unsaturated polyester. Examples of the thermosetting resin include an epoxy resin, a modified epoxy resin, a silicone resin, and a modified silicone resin. A thermosetting resin such as an epoxy resin or a silicone resin, which has good heat resistance and light resistance, is preferably used as the material of the resin member 22.

The material of the resin member 22 preferably contains a light reflective material. As the light reflective material, it is preferable to use a material that hardly absorbs light from the light-emitting elements 23a and 23b and has a large difference in refractive index with respect to a resin material. Examples of such a light reflective material include titanium oxide, zinc oxide, silicon oxide, zirconium oxide, aluminum oxide, and aluminum nitride. The light reflective material can be contained in a range from 10 wt. % to 90 wt. % with respect to a resin material, for example.

As illustrated in FIGS. 4 and 5, the upper surface of the resin member 22 preferably includes the inclined surface 22s that is inclined downward toward the outer side. In that case, a length S1 in the vertical direction of the portion of the resin member 22 that constitutes the outer lateral surface of the light source 20 can be reduced. Thus, a length S2 in the vertical direction of an outer lateral surface 26b of the second light-transmissive member 26 can be increased. As a result, the large amount of light in the lateral direction that is emitted from the light-emitting elements 23a and 23b can be easily extracted from the outer lateral surface 26b to the outside, so that the light extraction efficiency of the light source 20 is improved. The inclined surface 22s is preferably disposed surrounding the light-emitting elements 23a and 23b in a top view. In that case, the light extraction efficiency of the light source 20 is further improved. The upper surface of the resin member 22 may be formed as a flat surface without the inclined surface 22s.

Light-Emitting Elements 23a and 23b

The light-emitting elements 23a and 23b are semiconductor elements that emit light when a voltage is applied thereto, and known semiconductor elements formed of a nitride semiconductor or the like can be used. Examples of the light-emitting elements 23a and 23b include an LED chip. The light-emitting elements 23a and 23b include a semiconductor layered body. The semiconductor layered body includes an n-type semiconductor layer, a p-type semiconductor layer, and a light-emitting layer interposed therebetween. The light-emitting layer may have a structure such as a double heterojunction or a single quantum well (SQW) or may have a structure with a group of light-emitting layers, such as a multiple quantum well (MQW). The emission peak wavelength of the light-emitting layer can be selected as appropriate according to the purpose. The light-emitting layer can be formed such that it can emit visible light or ultraviolet light, for example. Examples of the semiconductor layered body including such a light-emitting layer include semiconductors having all compositions in a chemical formula of $In_xAl_yGa_{1-x-y}N$ ($0 \le x$, $0 \le y$, and $x+y \le 1$) in which composition ratios x and y are changed within respective ranges.

The semiconductor layered body may have a structure including one or more light-emitting layers between the n-type semiconductor layer and the p-type semiconductor layer or may have a structure in which a structure sequentially including the n-type semiconductor layer, the light-emitting layer, and the p-type semiconductor layer is repeated a plurality of times. When the semiconductor layered body includes a plurality of light-emitting layers, the plurality of light-emitting layers may include light-emitting layers having different emission peak wavelengths or light-emitting layers having the same emission peak wavelength. The same emission peak wavelength also includes a case in which there is a variation within ±10 nm. A combination of emission peak wavelengths between the plurality of light-emitting layers can be selected as appropriate. For example, when the semiconductor layered body includes two light-emitting layers, light-emitting layers can be selected in combination of blue light and blue light, green light and green light, red light and red light, ultraviolet light and ultraviolet light, blue light and green light, blue light and red light, or green light and red light. At least one of the light-emitting layers may include a plurality of active layers having different emission peak wavelengths or may include a plurality of active layers having the same emission peak wavelength.

In the example of FIG. 6, two light-emitting elements (light-emitting elements 23a and 23b) are mounted in one light source 20. However, the light sources 20 are not limited to this configuration, and only one light-emitting element may be mounted in one light source 20, or three or more light-emitting elements may be mounted in one light source 20. When one light source 20 includes a plurality of light-emitting elements, a plurality of light-emitting elements having the same emission peak wavelength may be combined in order to improve the luminous intensity of the entire light source 20. For example, in order to improve color reproductivity, a plurality of light-emitting elements having different emission peak wavelengths may be combined to correspond to a red color, a green color, and a blue color. When the light source 20 includes the plurality of light-emitting elements, all the light-emitting elements may be connected in series or may be connected in parallel, or the light-emitting elements may be connected in a combination of series connection and parallel connection. The light-emitting element may be mounted in a face-up manner in which it is mounted with the surface on which the electrodes are formed facing upward or mounted in a flip-chip manner in which it is mounted with the surface on which the electrodes are formed facing downward.

Light-Transmissive Member 24

The first light-transmissive member 25 and the second light-transmissive member 26 that constitute the light-transmissive member 24 are members having transmissivity to light from the light-emitting element 23. In the present disclosure, having transmissivity means that the light transmittance for the peak wavelength of a light-emitting element 23 is 50% or more. When the light source 20 includes the plurality of light-emitting elements 23a and 23b, the light transmittance for the peak wavelength of at least one of the light-emitting elements 23a and 23b needs to be 50% or more.

First Light-Transmissive Member 25

The first light-transmissive member 25 includes, for example, a resin. Examples of the resin include known resins having transmissivity such as a silicone resin and an epoxy resin. Among them, a silicone resin having good reliability (specifically, a phenyl silicone resin, a dimethyl silicone resin, or the like) can be suitably used.

The first light-transmissive member 25 can contain a wavelength conversion material. This can make the color adjustment of the light source 20 easier. The wavelength conversion material contained in the first light-transmissive member 25 may be of one type or a plurality of types. A phosphor contained in the first light-transmissive member 25 may be dispersed or unevenly distributed. As the wavelength conversion member, a known phosphor can be used. The phosphor is excited by the light emitted by the light-emitting element 23 and emits light having a wavelength different from the wavelength of the light emitted by the light-emitting element 23. As the phosphor, an yttrium aluminum garnet-based phosphor (for example, $(Y,Gd)_3(Al,Ga)_5O_{12}$:Ce), a lutetium aluminum garnet-based phosphor (for example, $Lu_3(Al,Ga)_5O_{12}$:Ce), a terbium aluminum garnet-based phosphor (for example, $Tb_3(Al,Ga)_5O_{12}$:Ce), a CCA-based phosphor (for example, $Ca_{10}(PO_4)_6Cl_2$:Eu), an SAE-based phosphor (for example, $Sr_4Al_{14}O_{25}$:Eu), a chlorosilicate-based phosphor (for example, $Ca_8MgSi_4O_{16}Cl_2$:Eu), a silicate-based phosphor (for example, $(Ba,Sr,Ca,Mg)_2SiO_4$:Eu), an oxynitride-based phosphor such as a β-SiAlON-based phosphor (for example, $(Si,Al)_3(O,N)_4$:Eu) or an α-SiAlON-based phosphor (for example, $Ca(Si,Al)_{12}(O,N)_{16}$:Eu), a nitride-based phosphor such as an LSN-based phosphor (for example, $(La,Y)_3Si_6N_{11}$:Ce), a BSESN-based phosphor (for example, $(Ba,Sr)_2Si_5N_8$:Eu), an SLA-based phosphor (for example, $SrLiAl_3N_4$:Eu), a CASN-based phosphor (for example, $CaAlSiN_3$:Eu), or an SCASN-based phosphor (for example, (Sr,Ca)AlSiN$_3$:Eu), a fluoride-based phosphor such as a KSF-based phosphor (for example, K$_2$SiF$_6$:Mn), a KSAF-based phosphor (for example, K$_2$(Si$_{1-x}$Al$_x$)F$_{6-x}$:Mn, where x satisfies 0<x<1), or an MGF-based phosphor (for example, 3.5MgO·0.5MgF$_2$·GeO$_2$:Mn), a quantum dot having a perovskite structure (for example, (Cs,FA,MA)(Pb,Sn)(F,Cl,Br,I)$_3$, where FA and MA represent formamidinium and methylammonium, respectively), a group II-VI quantum dot (for example, CdSe), a III-V quantum dot (for example, InP), a quantum dot having a chalcopyrite structure (for example, (Ag,Cu)(In,Ga)(S,Se)$_2$), or the like can be used.

Second Light-Transmissive Member 26

In the example of FIGS. 4 and 5, the second light-transmissive member 26 covers the upper surface of the first light-transmissive member 25 and the upper surface of the resin member 22 including the inclined surface 22s. Thus, the light from the light-emitting elements 23a and 23b can be extracted to the outside of the light source 20 via the second light-transmissive member 26. In the example of FIGS. 4 and 5, the second light-transmissive member 26 covers the upper surfaces of the light-emitting elements 23a and 23b with the first light-transmissive member 25 interposed therebetween. Alternatively, the second light-transmissive member 26 may be in contact with the upper surfaces of the light-emitting elements 23a and 23b and cover the light-emitting elements 23a and 23b. In other words, the light-transmissive member 24 may be composed of only the second light-transmissive member 26.

In the example illustrated in FIGS. 4 and 5, the second light-transmissive member 26 has the upper surface 26a and the outer lateral surface 26b. Between the upper surface 26a and the outer lateral surface 26b of the second light-transmissive member 26, the inclined surface 26s inclined downward toward the outer side is preferably provided. That is, each lateral surface of the second light-transmissive member 26 preferably includes the outer lateral surface 26b (vertical surface) and the inclined surface 26s. In this case, for example, in the second light-transmissive member 26, the outer lateral surface 26b is located outward of the upper surface 26a in a top view, and the inclined surface 26s connects the upper end of the outer lateral surface 26b and the outer edge of the upper surface 26a. Because lateral surfaces of the second light-transmissive member 26 include the inclined surfaces 26s, light from the light-emitting elements 23a and 23b can be easily extracted to the outside.

In the second light-transmissive member 26 having this shape, the outer lateral surface 26b is located below the inclined surface 26s and is located outward of the inclined surface 26s in a top view. Therefore, the large amount of light that is emitted from the light-emitting elements 23a and 23b in the lateral direction is more likely to hit the outer lateral surface 26b than the inclined surface 26s. This can make it easy to extract a large amount of light that is emitted from the light-emitting elements 23a and 23b in the lateral direction to the outside of the light source 20 from the outer lateral surface 26b, and thus the light from the light-emitting elements 23a and 23b can be efficiently spread in the lateral direction in the light source 20. In a top view, the inclined surface 26s and the outer lateral surface 26b preferably surround the light-emitting elements 23a and 23b. In that case, the light from the light-emitting elements 23a and 23b can be more efficiently spread in the lateral direction.

The roughness of the outer lateral surface 26b may be the same as the roughness of the inclined surface 26s, or may be greater than the roughness of the inclined surface 26s. When the roughness of the outer lateral surface 26b is greater than the roughness of the inclined surface 26s, the surface area of the outer lateral surface 26b can be increased. This can make it easier to extract light from the light-emitting elements 23a and 23b to the outside of the light source 20 from the outer lateral surface 26b. The large amount of light that is emitted from the light-emitting elements 23a and 23b in the lateral direction is likely to hit the outer lateral surface 26b. Therefore, the large amount of light that is emitted from the light-emitting elements 23a and 23b in the lateral direction can be efficiently spread in the lateral direction.

For example, a resin material can be used as a base material of the second light-transmissive member 26. A thermosetting resin is preferable as the resin used as the base material of the second light-transmissive member 26. Examples of the thermosetting resin include an epoxy resin, a modified epoxy resin, a silicone resin, a modified silicone resin, an acrylate resin, an urethane resin, and a fluorine-based resin. Among them, a silicone resin and a modified silicone resin are preferable because they are good in heat resistance and light resistance. For example, a phenyl silicone resin or a dimethyl silicone resin can be used as the base material of the second light-transmissive member 26. The base material of the second light-transmissive member 26 may be the same material as the base material of the first light-transmissive member, or may be a different material.

The second light-transmissive member 26 may contain or need not contain a light reflective material. When the second light-transmissive member 26 contains a light reflective material, the light distribution characteristics of the light source 20 can be easily adjusted. As the light reflective material, it is preferable to use a member that hardly absorbs light from the light-emitting elements 23a and 23b and has a large difference in refractive index with respect to the base material. Examples of such a light reflective material include titanium oxide, zinc oxide, silicon oxide, zirconium oxide, aluminum oxide, and aluminum nitride.

The second light-transmissive member 26 may contain or need not contain a wavelength conversion member, similarly to the first light-transmissive member 25. When the wavelength conversion member is contained in the first light-transmissive member 25, the wavelength conversion material need not be contained in the second light-transmissive member 26. The wavelength conversion material is as described above.

Light Adjustment Member 27

The light adjustment member 27 has reflectivity and transmissivity to light emitted by the light-emitting elements 23a and 23b. Part of the light emitted from the upper surface of the light-transmissive member 24 is reflected by the light adjustment member 27, and the other part is transmitted through the light adjustment member 27.

The light adjustment member 27 covers the upper surfaces of the light-emitting elements 23a and 23b with the light-transmissive member 24 interposed therebetween. As a result, part of the light traveling upward from the light-emitting elements 23a and 23b is reflected by the light adjustment member 27, so that the amount of light emitted from the light source 20 in the lateral direction tends to be large. In a top view, at least a portion of the light-emitting elements 23a and 23b overlaps the light adjustment member 27. It is preferable that the entire light-emitting elements 23a and 23b overlap the light adjustment member 27 in a top view. In these ways, part of the light traveling upward from the light-emitting elements 23a and 23b can be reflected. Thus, the amount of light emitted from the light source 20 is likely to be large in the lateral direction.

As a material of the light adjustment member 27, a metal may be used, or a resin material containing a light reflective material may be used. When a resin material is used as a base material of the light adjustment member 27, the same resin material as that of the second light-transmissive member 26 can be used. Examples of the light reflective material can include titanium oxide, zinc oxide, silicon oxide, zirconium oxide, aluminum oxide, and aluminum nitride as in the case of the second light-transmissive member 26. The light reflective material can be contained at a ratio in a range from 10 wt. % to 90 wt. % with respect to the resin material, for example. When the light-transmissive member 24 contains the light reflective material, the concentration of the light reflective material contained in the light adjustment member 27 is higher than the concentration of the light reflective material contained in the light-transmissive member 24.

A difference between the coefficient of linear expansion of the base material of the second light-transmissive member 26 and the coefficient of linear expansion of the base material of the light adjustment member 27 is not particularly limited but is preferably within 30 ppm/° C. Accordingly, it is possible to reduce the possibility that the light adjustment member 27 is peeled off from the second light-transmissive member 26. For example, when phenyl silicone resin is used as the base material of the second light-transmissive member 26, phenyl silicone resin can be used as the base material of the light adjustment member 27. The second light-transmissive member 26 and the light adjustment member 27 may be in contact with each other, or a known adhesive member may be disposed between the second light-transmissive member 26 and the light adjustment member 27.

Variation

Figure 9:
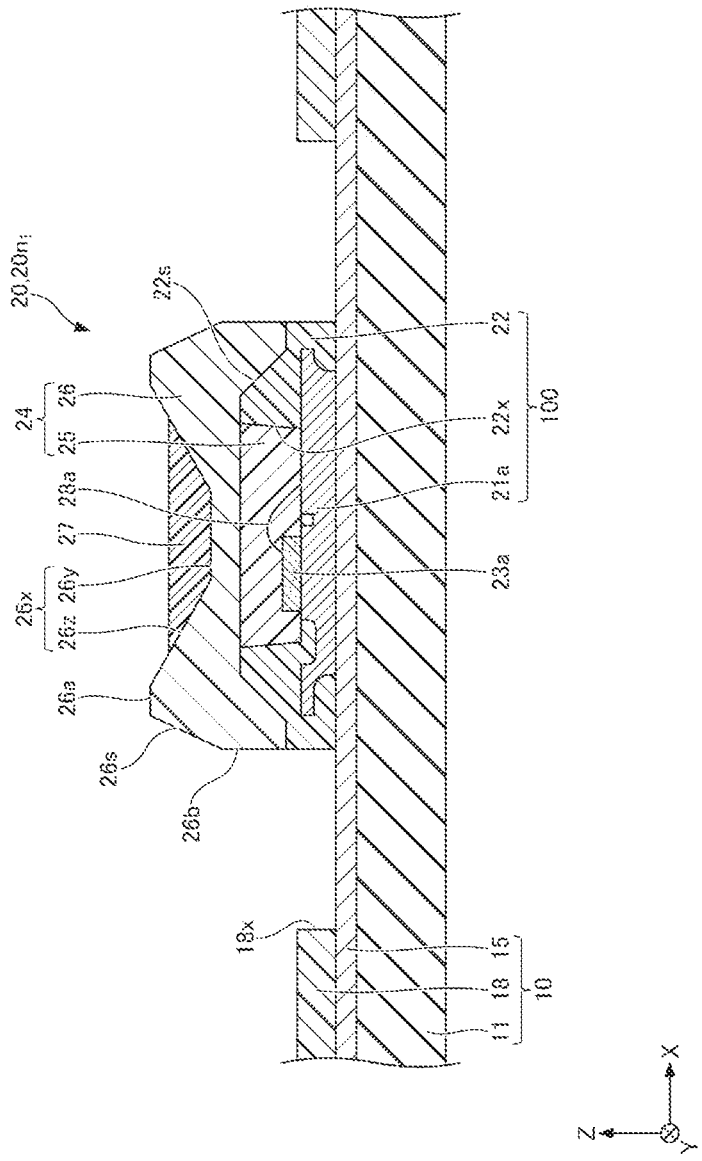
FIG. 9 is a schematic cross-sectional view (part 1) illustrating another example of a shape of the light adjustment member in the planar light source according to the first embodiment.

FIG. 9 is a schematic cross-sectional view (part 1) illustrating another example of a shape of the light adjustment member in the planar light source according to the first embodiment. As illustrated in FIG. 9, in the first light source $20n_1$, the upper surface of the light adjustment member 27 may be a flat surface. The volume of the light adjustment member 27 in the first light source $20n_1$ illustrated in FIG. 9 is smaller than the volume of the light adjustment member 27 in the central light source 20m illustrated in FIG. 4. Also in this case, in the first light source $20n_1$, because the light transmittance of the light adjustment member 27 is higher than the light transmittance of the light adjustment member 27 of the central light source 20m, it is possible to reduce the luminance unevenness between the central region 1m and the peripheral region 1n of the planar light source 1 as in the case of FIG. 5.

Figure 10:
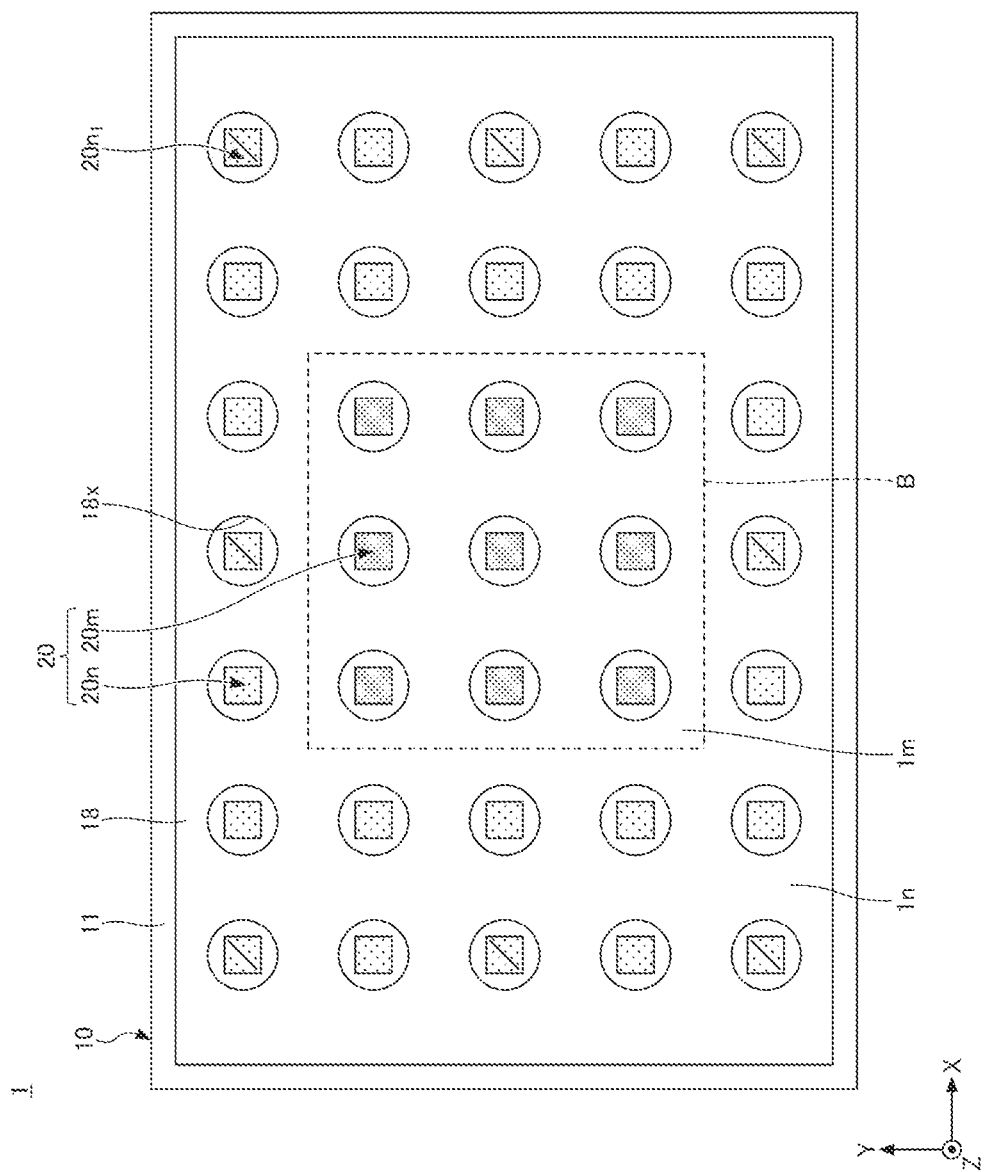
FIG. 10 is a schematic top view (part 1) illustrating another example of an arrangement of light sources in the planar light source according to the first embodiment.

FIG. 10 is a schematic top view (part 1) illustrating another example of an arrangement of the light sources in the planar light source according to the first embodiment. In the example of FIG. 10, in the outermost periphery of the planar light source 1, the peripheral light sources located at the four corners and the peripheral light sources located in the middle of the adjacent corners are the first light sources $20n_1$. The light adjustment member 27 of the peripheral light source 20n other than the first light source $20n_1$ have a light transmittance between the light transmittance of the light adjustment member 27 of the first light source $20n_1$ and the light transmittance of the light adjustment member 27 of the central light source 20m. Also, when part of the peripheral light sources 20n is the first light sources $20n_1$ as described above, it is possible to reduce the luminance unevenness between the central region 1m and the peripheral region 1n of the planar light source 1.

Figure 11:
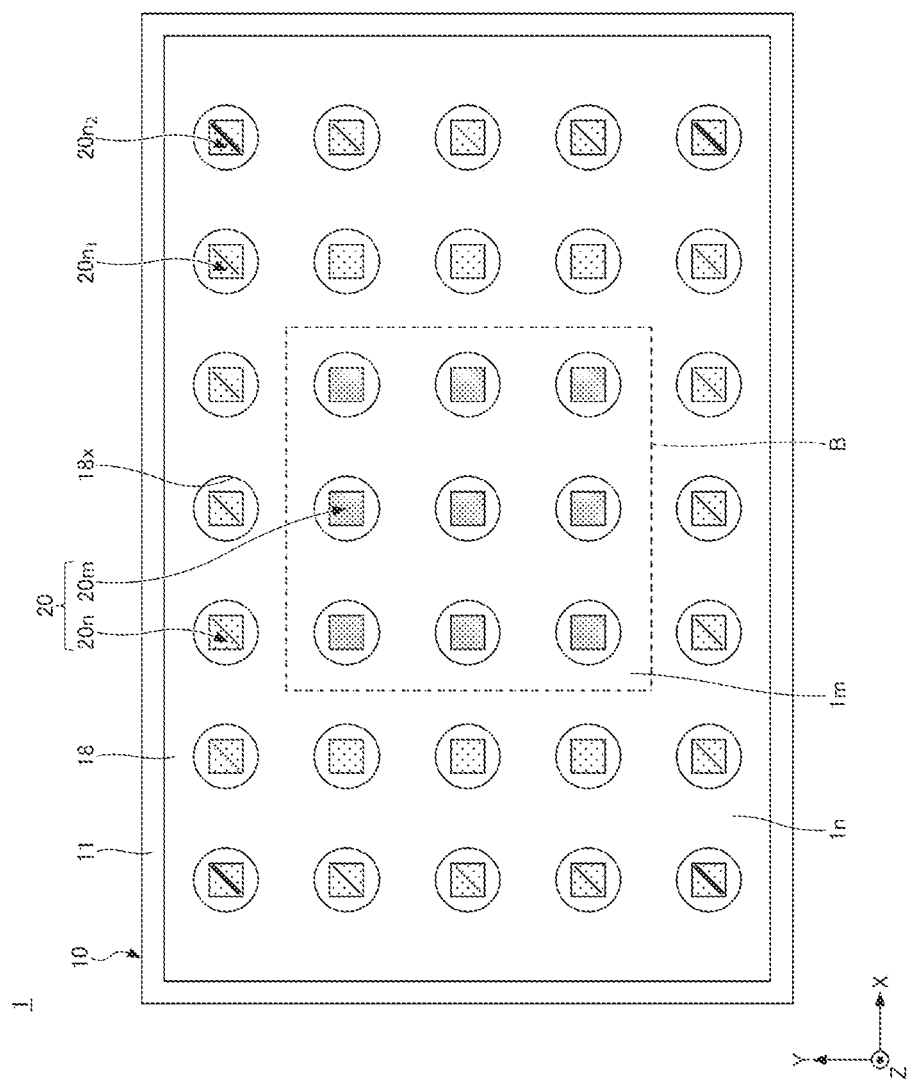
FIG. 11 is a schematic top view (part 2) illustrating another example of an arrangement of the light sources in the planar light source according to the first embodiment.

FIG. 11 is a schematic top view (part 2) illustrating another example of an arrangement of the light sources in the planar light source according to the first embodiment. In the example of FIG. 11, in the planar light source 1, the peripheral light sources 20n include the first light sources $20n_1$ and second light sources $20n_2$ in which a light transmittance of the light adjustment member 27 is higher than the light transmittance of the light adjustment members 27 of the first light sources $20n_1$. For example, the second light sources $20n_2$ may have the shape illustrated in FIGS. 3 and 5, the first light sources $20n_1$ may have the shape illustrated in FIG. 9, and the central light sources 20m may have the shape illustrated in FIGS. 2 and 4. In FIG. 11, the first light sources $20n_1$ are indicated by a low-density dot pattern and a thin oblique line, and the second light sources $20n_2$ are indicated by a low-density dot pattern and a thick oblique line.

In the example of FIG. 11, the second light sources $20n_2$ are disposed at four corners of the outer peripheral light sources 20n located at the outermost periphery, and the first light sources $20n_1$ are disposed between adjacent corners of these four corners. Because the luminance of the second light sources $20n_2$ on the optical axis is higher than the luminance of the first light sources $20n_1$ on the optical axis, the arrangement as illustrated in FIG. 11 can reduce the luminance unevenness between the central region 1m and the peripheral region 1n of the planar light source 1. Even when a planar light source is a polygon other than a quadrangle, having a plurality of corners in a top view, the second light sources $20n_2$ can be disposed at corners of the outer peripheral light sources 20n located at the outermost periphery and the first light sources $20n_1$ can be disposed between the corners.

Figure 12:
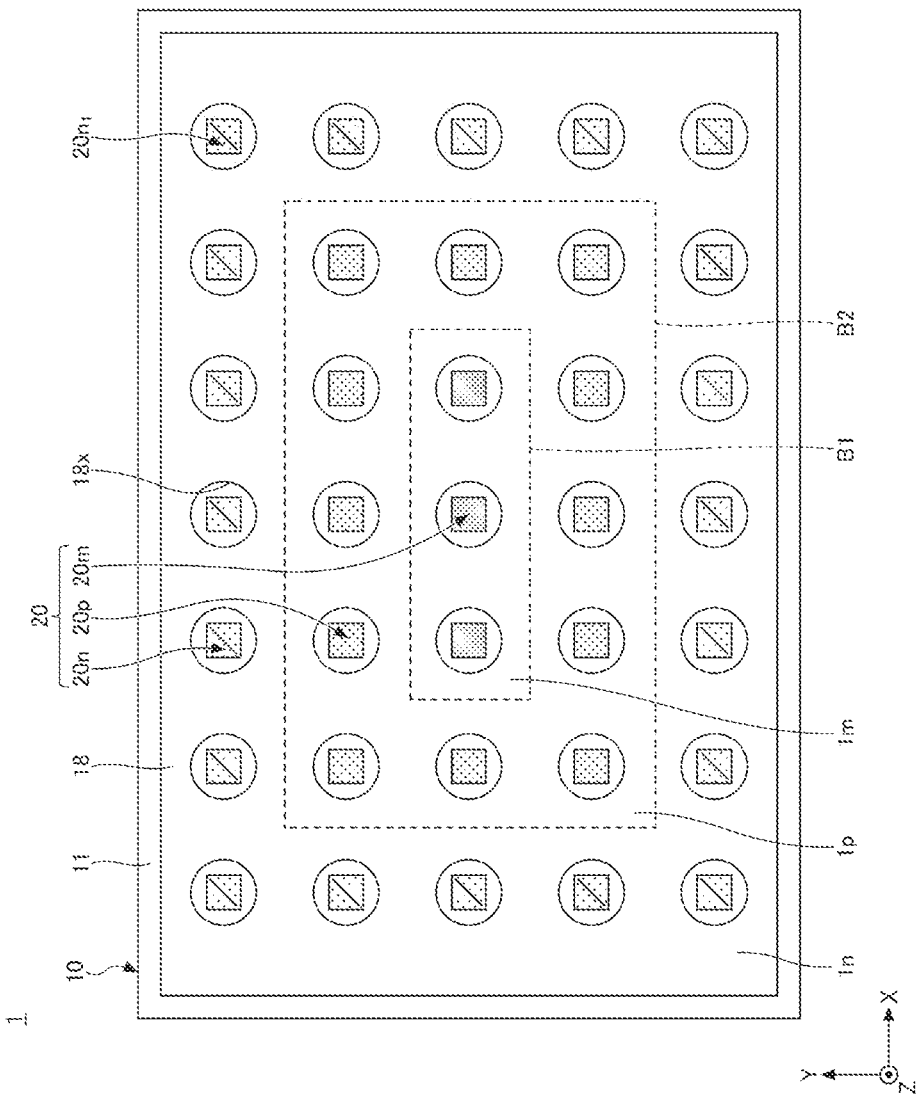
FIG. 12 is a schematic top view (part 3) illustrating another example of an arrangement of the light sources in the planar light source according to the first embodiment.

FIG. 12 is a schematic top view (part 3) illustrating another example of an arrangement of the light sources in the planar light source according to the first embodiment. As illustrated in FIG. 12, a boundary B1 and a boundary B2 located on the outer peripheral side of the boundary B1 can be defined. In the example of FIG. 12, in a top view, the planar light source 1 further includes, as a region 1n which the plurality of light sources 20 are disposed, an intermediate region 1p located between the central region 1m and the peripheral region 1n, in addition to the central region 1m located on the center side with respect to the boundary B1, a peripheral region 1n located outward of the boundary B2.

In the planar light source 1, among the plurality of light sources 20, the light sources disposed in the intermediate region 1p are referred to as intermediate light sources 20p. In a top view, the plurality of light sources 20 include a plurality of the central light sources 20m disposed in the central region 1m, a plurality of the intermediate light sources 20p disposed in the intermediate region 1p, and a plurality of the peripheral light sources 20n disposed in the peripheral region 1n.

In the plurality of intermediate light sources 20p, the light transmittance of the light adjustment member 27 is higher than the light transmittance of the light adjustment members 27 of the central light sources 20m and lower than the light transmittance of the light adjustment members 27 of the first light sources $20n_1$. For example, the first light sources $20n_1$ may have the shape illustrated in FIGS. 3 and 5, the intermediate light sources 20p may have the shape illustrated in FIG. 9, and the central light sources 20m may have the structure illustrated in FIGS. 2 and 4.

In FIG. 12, the central light sources 20m are indicated by a high-density dot pattern, the peripheral light sources 20n are indicated by a low-density dot pattern, and the intermediate light sources 20p are indicated by a medium-density dot pattern. In the example of FIG. 12, all the peripheral light sources 20n are the first light sources $20n_1$. However, no such limitation is intended. For example, in the peripheral region $1n$, the first light sources $20n_1$ may be disposed only at the corner(s).

The luminance of the intermediate light sources $20p$ on the optical axis is higher than the luminance of the central light sources $20m$ on the optical axis, and the luminance of the first light sources $20n_1$ on the optical axis is even higher than the luminance of the intermediate light sources $20p$ on the optical axis. Therefore, the arrangement illustrated in FIG. 12 can further reduce the luminance unevenness of the entire planar light source 1 as compared with the example illustrated in FIG. 1.

Figure 13:
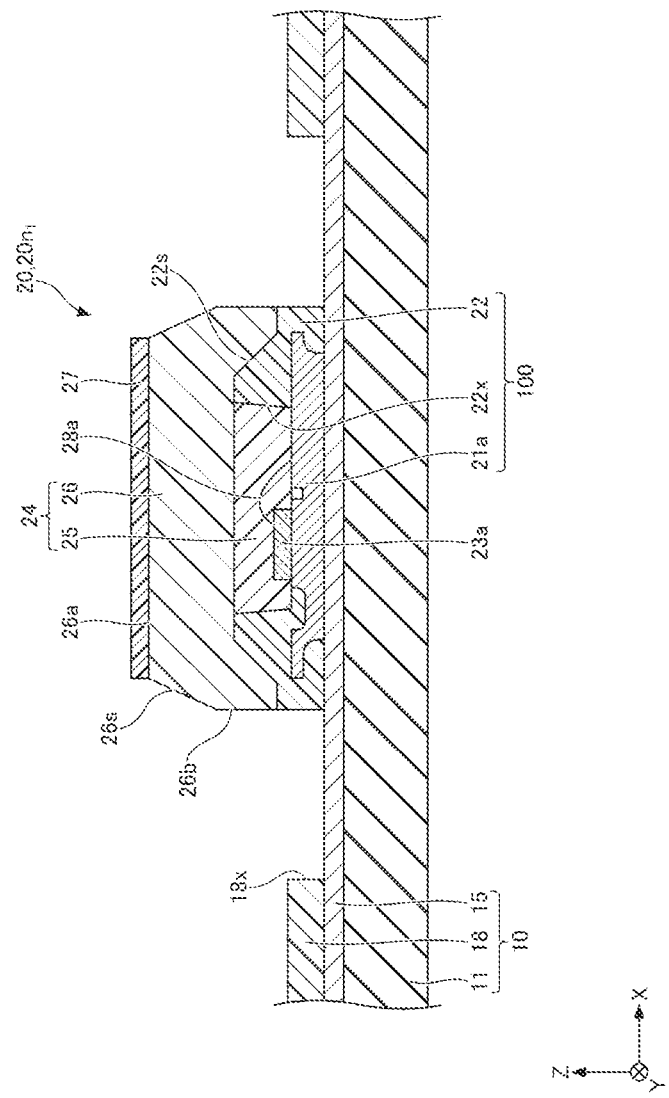
FIG. 13 is a schematic cross-sectional view (part 2) illustrating another example of the shape of the light adjustment member in the planar light source according to the first embodiment.

FIG. 13 is a schematic cross-sectional view (part 2) illustrating another example of the shape of the light adjustment member in the planar light source according to the first embodiment. In the example of FIG. 13, in the first light source $20n_1$, the light adjustment member 27 has a plate shape with a substantially constant thickness. The upper surface of light adjustment member 27 is, for example, a flat surface. In this case, the light transmittance of the light adjustment member 27 can be changed by changing the thickness of the light adjustment member 27 without changing the concentration of the light reflective material contained in the light adjustment member 27.

Figure 14:
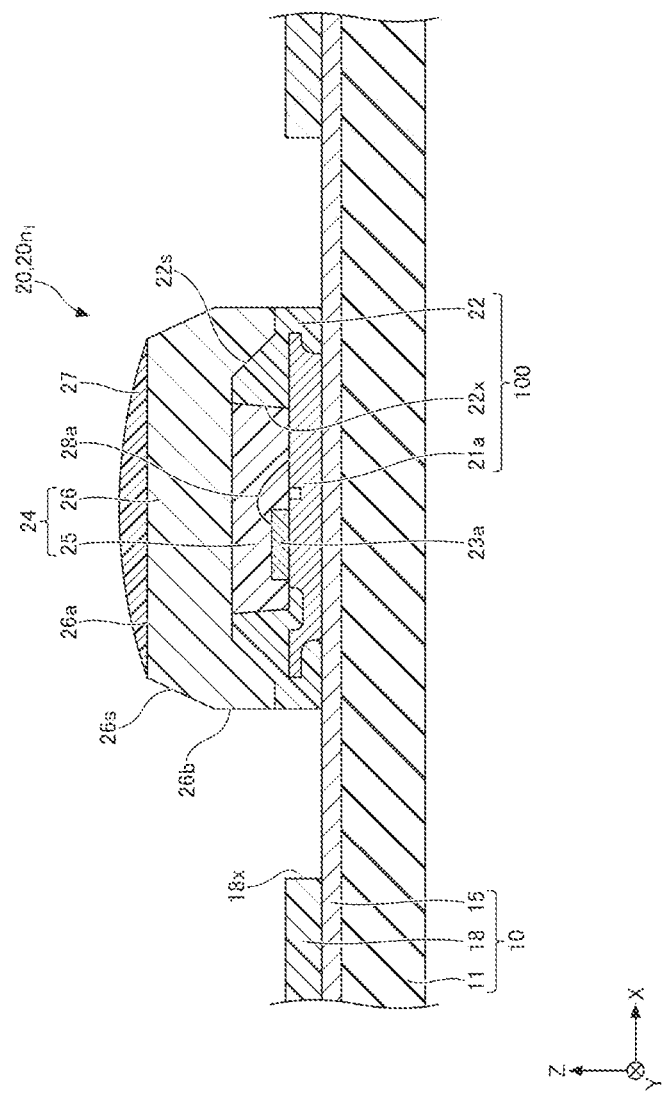
FIG. 14 is a schematic cross-sectional view (part 3) illustrating another example of the shape of the light adjustment member in the planar light source according to the first embodiment.

FIG. 14 is a schematic cross-sectional view (part 3) illustrating another example of the shape of the light adjustment member in the planar light source according to the first embodiment. In the example of FIG. 14, the light adjustment member 27 has a shape that is convex upward from the upper surface 26a of the second light-transmissive member 26. In the light adjustment member 27 illustrated in FIG. 14, for example, the height from the upper surface 26a is the greatest at the center portion and decreases toward the peripheral portion in a top view. In addition, as illustrated in FIG. 14, in the shape in which the light adjustment member 27 is thick at the center and becomes thinner toward the outer peripheral side, the light transmittance can be reduced at the center of the light adjustment member 27, and the light transmittance can be increased toward the outer side of the light adjustment member 27. Therefore, the batwing type emission intensity distribution is easily obtained.

In the case in which the light adjustment member 27 illustrated in FIGS. 13 and 14 contains a resin, the light adjustment member 27 can be disposed in the recessed portion 26x by using, for example, a dropping method.

In the example described above, the light transmittance of the light adjustment member 27 is changed by changing the volume of the light adjustment member 27 without changing the concentration of the light reflective material contained in the light adjustment member 27. However, the light transmittance of the light adjustment member 27 may be changed by a factor other than the volume of the light adjustment member 27.

For example, when the light adjustment member 27 contains a light reflective material, the light transmittance of the light adjustment member 27 can be changed by changing the concentration [wt. %] of the light reflective material. When the concentration of the light reflective material decreases, light easily passes through the light adjustment member 27, and thus the transmittance increases. By setting the concentration of the light reflective material contained in the light adjustment member 27 of the first light source $20n_1$ to lower than the concentration of the light reflective material contained in the light adjustment member 27 of the central light source $20m$, the light transmittance of the light adjustment member 27 of the first light source $20n_1$ can be made higher than the light transmittance of the light adjustment member 27 of the central light source $20m$.

When the light adjustment member 27 contains a light reflective material and a resin, the light transmittance of the light adjustment member 27 can be changed by changing a difference in refractive index between the light reflective material and the resin. When the difference in refractive index between the light reflective material and the resin is small, light can easily pass through the light adjustment member 27, so that the transmittance is increased. By setting the difference in refractive index between the light reflective material and the resin of the light adjustment member 27 disposed in the first light source $20n_1$ to smaller than the difference in refractive index between the light reflective material and the resin of the light adjustment member 27 disposed at the central light source $20m$, the light transmittance of the light adjustment member 27 of the first light source $20n_1$ can be made higher than the light transmittance of the light adjustment member 27 of the central light source $20m$.

In addition, the light-emitting elements 23a and 23b may be sorted, the light-emitting elements 23a and 23b having a relatively high luminance may be used as the first light sources $20n_1$, and the light-emitting elements 23a and 23b having a relatively low luminance may be used as the central light sources $20m$. Thus, the light transmittances of the light adjustment members 27 of the first light sources $20n_1$ can be made higher than the light transmittances of the light adjustment members 27 of the central light sources $20m$.

In addition, light sources in which a light absorbing member is disposed on the light adjustment member 27 can be used as the central light sources $20m$, and light sources in which no light absorbing member is disposed on the light adjustment member 27 can be used as the first light sources $20n_1$. Thus, the light transmittances of the light adjustment members 27 of the first light sources $20n_1$ can be made higher than the light transmittances of the light adjustment members 27 of the central light sources $20m$.

In addition, the magnitude of the light transmittance of the light adjustment member 27 can be adjusted by changing the shape of the recessed portion opening in the upper surface 26a of the second light-transmissive member 26.

Any of the methods of changing the light transmittance of the light adjustment member 27 may be used alone or in combination of two or more thereof.

Figure 15:
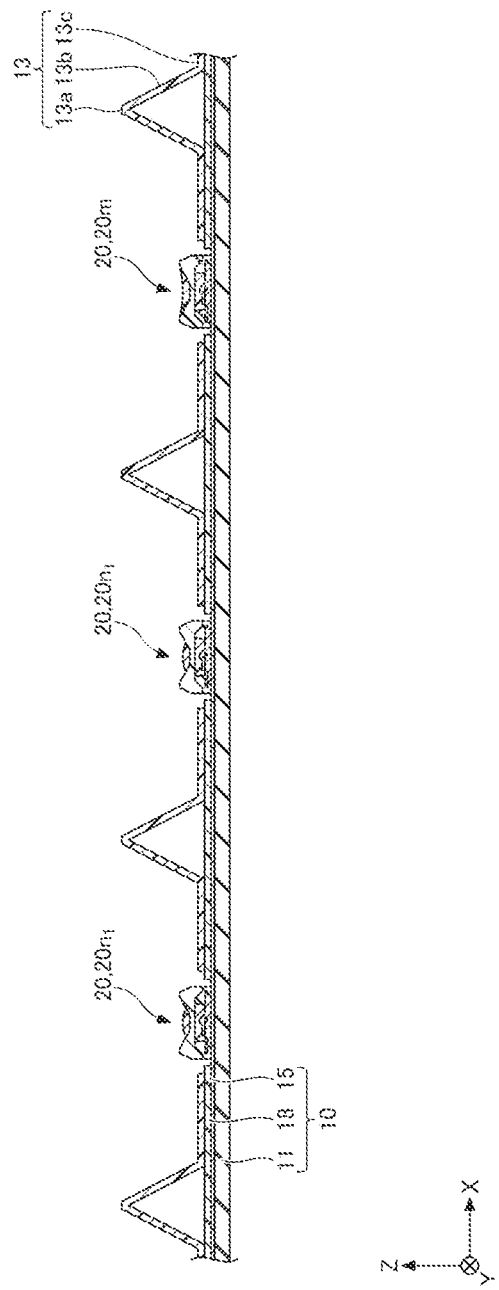
FIG. 15 is a schematic partial cross-sectional view illustrating the planar light source including a partition member.

FIG. 15 is a schematic partial cross-sectional view illustrating the planar light source including a partition member. As illustrated in FIG. 15, the planar light source 1 can include a partition member 13.

The partition member 13 is disposed on the same side of the substrate 10 as the light source 20. The partition member 13 includes top portions 13a disposed in a grid pattern in a top view, wall portions 13b surrounding each of the light sources 20 in a top view, and bottom portions 13c connected to the lower ends of the wall portions 13b, and includes a plurality of regions surrounding the light source 20. The wall portion 13b of the partition member 13, for example, extends from the top portion 13a toward the substrate 10, and in a cross-sectional view, the width in the region surrounded by the opposing wall portions 13b interposing the light source 20 therebetween becomes smaller on the side closer to the substrate 10. In the example of FIG. 15, one of the light sources 20 is disposed in one section surrounded by the wall portions 13b. However, two or more light sources 20 can be disposed in one section.

The partition member 13 preferably has light reflectivity. In that case, the light emitted from the light source 20 can be efficiently reflected upward by the partition member 13. In this case, the partition member 13 can be formed using a resin or the like containing a light reflective material such as titanium oxide, aluminum oxide, silicon oxide, or the like, or can be formed using a resin containing no reflective material and then provided with a reflective material on the surface. Alternatively, a resin containing a plurality of fine bubbles may be used. In this case, light is reflected at an interface between the bubble and the resin. Examples of the resin used for the partition member 13 include thermoplastic resins such as an acrylic resin, a polycarbonate resin, a cyclic polyolefin resin, polyethylene terephthalate, polyethylene naphthalate, and polyester, and thermosetting resins such as an epoxy resin and a silicone resin. The partition member 13 is preferably set such that the reflectance to the light emitted from the light source 20 is 70% or greater.

In the above-described example, the planar light source 1 includes the substrate 10. However, no such limitation is intended, and the substrate 10 is provided as necessary and can be omitted. For example, in the planar light source 1, it is possible to use a structure in which the plurality of light sources 20 are held by an integral light-transmissive resin or the like.

The planar light source 1 may include an optical member disposed above the light source 20 with the partition member 13 interposed therebetween. The optical sheet is, for example, a diffusion sheet. When the planar light source 1 includes a diffusion sheet, it is possible to improve uniformity of light extracted from the planar light source 1 to the outside. Further, the planar light source 1 can further include at least one selected from the group consisting of a wavelength conversion sheet, a first prism sheet, a second prism sheet, and a polarizing sheet above the diffusion sheet. When the planar light source 1 includes one or more of these optical members, the uniformity of light can be further improved.

Second Embodiment

In a second embodiment, an example of a liquid crystal display device using the planar light source 1 as a backlight source is described.

Figure 16:
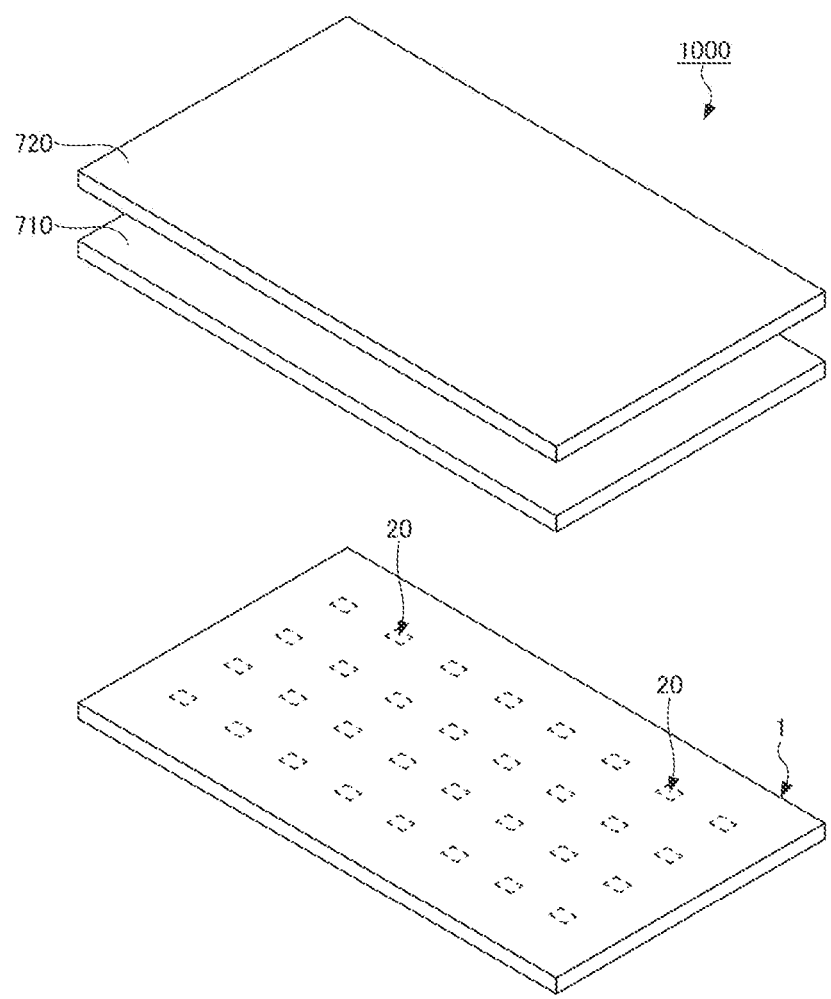
FIG. 16 is a configuration view illustrating a liquid crystal display device according to a second embodiment.

FIG. 16 is a configuration view illustrating a liquid crystal display device according to the second embodiment. As illustrated in FIG. 16, a liquid crystal display device 1000 includes, in order from the top, a liquid crystal panel 720, an optical member 710, and the planar light source 1. For example, an optical member in which a diffusion plate, a phosphor sheet, a first prism sheet, a second prism sheet, and a DBEF (reflective polarizing sheet) are layered in order from the planar light source 1 side can be provided above the light sources 20 of the planar light source 1.

The liquid crystal display device 1000 is a so-called direct-lit liquid crystal display device in which the planar light source 1 is layered below the liquid crystal panel 720. In the liquid crystal display device 1000, the liquid crystal panel 720 is irradiated with the light emitted from the planar light source 1.

From the viewpoint of thinning the planar light source 1, the thickness of the planar light source 1 can be equal to or less than 15 mm. This can reduce the thickness of the planar light source 1, leading to a reduction in the thickness of the liquid crystal display device 1000.

The planar light source 1 can be used as a backlight for the liquid crystal display device 1000 for televisions, tablets, smartphones, smart watches, head-up displays, digital signage, bulletin boards, and the like. In addition, the planar light source 1 can also be used as a light source for lighting, and can also be used for emergency lights, line lighting, various lightings, vehicle instrument panels, and the like.

Preferred embodiments and the like have been described above in detail. However, the present invention is not limited to the above-described embodiments, and various modifications and substitutions can be made to the above-described embodiments and the like without departing from the scope described in the claims.

Aspects below are further disclosed in addition to the above descriptions.

What is claimed is:

1. A planar light source comprising:
a plurality of light sources disposed two-dimensionally, each comprising:
a light-emitting element,
a light-transmissive member covering the light-emitting element, and
a light adjustment member disposed on an upper surface of the light-transmissive member and located above the light-emitting element; wherein:
the plurality of light sources include, in a top view, a plurality of central light sources disposed in a central region, and a plurality of peripheral light sources disposed in a peripheral region located outward of the central region; and
the plurality of peripheral light sources include a first light source in which a light transmittance of the light adjustment member is higher than a light transmittance of the light adjustment members of the central light sources.

2. The planar light source according to claim 1, wherein:
in the light sources, the upper surface of the light-transmissive member includes a recessed portion located above the light-emitting element and opening on an upper surface side of the light transmissive member; and
the light adjustment member is disposed in the recessed portion.

3. The planar light source according to claim 2, wherein:
the light-transmissive member includes a bottom surface and an inner lateral surface defining the recessed portion, the inner lateral surface being inclined with respect to the bottom surface; and
the light adjustment member of the first light source covers the bottom surface and a portion of the inner lateral surface closer to the bottom surface, and does not cover a portion of the inner lateral surface closer to the upper surface of the light-transmissive member.

4. The planar light source according to claim 3, wherein:
in a top view, an area of the light adjustment member of the first light source is smaller than an area of the light adjustment member of each of the central light sources.

5. The planar light source according to claim 3, wherein:
the light adjustment member of the first light source has a shape that is convex in a direction away from the bottom surface defining the recessed portion.

6. The planar light source according to claim 3, wherein:
the light adjustment members of the central light sources entirely cover the bottom surfaces and the inner lateral surfaces of the recessed portions of the central light sources.

7. The planar light source according to claim 6, wherein:
the light adjustment members of the central light sources has a shape that is concave toward the bottom surfaces of the recessed portions of the central light sources.

8. The planar light source according to claim 1, wherein:
a volume of the light adjustment member of the first light source is smaller than a volume of the light adjustment member of each of the central light sources.

9. The planar light source according to claim 1, wherein:
the light adjustment member contains a light reflective material; and
a concentration of the light reflective material contained in the light adjustment member of the first light source is lower than a concentration of the light reflective material contained in the light adjustment members of the central light sources.

10. The planar light source according to claim 1, wherein:
the light adjustment member comprises a light reflective material and a resin; and
a difference in refractive index between the light reflective material and the resin of the light adjustment member disposed in the first light source is smaller than a difference in refractive index between the light reflective material and the resin of the light adjustment members disposed in the central light sources.

11. The planar light source according to claim 1, wherein:
a light transmittance of the light adjustment members of the peripheral light sources is higher than a light transmittance of the light adjustment members of the central light sources.

12. The planar light source according to claim 1, wherein:
the plurality of peripheral light sources include a second light source in which a light transmittance of the light adjustment member is higher than the light transmittance of the light adjustment member of the first light source.

13. The planar light source according to claim 12, wherein:
the planar light source has a polygonal shape having a plurality of corners in a top view;
the second light source is disposed at one of the corners; and
the first light source is disposed between adjacent ones of the corners.

14. The planar light source according to claim 1, wherein:
the plurality of light sources further include, in a top view, a plurality of intermediate light sources disposed in an intermediate region located between the central region and the peripheral region; and
a light transmittance of the light adjustment members of the intermediate light sources is higher than the light transmittance of the light adjustment members of the central light sources and lower than the light transmittance of the light adjustment member of the first light source.

15. The planar light source according to claim 1, wherein:
in the light sources, each lateral surface of the light-transmissive member includes a vertical surface and an inclined surface, the vertical surface is located outward of the upper surface of the light-transmissive member in a top view, and the inclined surface connects an upper end of the vertical surface and an outer edge of the upper surface.

16. A liquid crystal display device comprising the planar light source according to claim 1 as a backlight source.

* * * * *